United States Patent Office 3,493,404
Patented Feb. 3, 1970

3,493,404
CERAMIC MATERIAL
John Alfred Earl, Alhambra, Calif., assignor to Physical Sciences Corporation, Arcadia, Calif., a corporation of California
No Drawing. Filed June 22, 1964, Ser. No. 377,104
The portion of the term of the patent subsequent to Oct. 18, 1983, has been disclaimed
Int. Cl. C03c 7/02
U.S. Cl. 106—48                                    2 Claims

ABSTRACT OF THE DISCLOSURE

This invention relates to a method of forming a ceramic material having properties of serving as an electrical insulation above $10^6$ ohms/cm.$^2$ through an extended range of temperatures to approximately 1800° F. In the method constituting this invention, the oxides of calcium, boron and silicon are mixed in certain percentages and are smelted at a particular elevated temperature to form a first frit. The first frit is then mixed with additional amounts of the oxides of calcium, boron and silicon and with the oxides of magnesium, aluminum and titanium and the mixture is smelted at a particular elevated temperature to form the ceramic material.

---

The present invention relates to a ceramic material having properties of providing electrical insulation and a hermetic seal over an extended range of temperatures. This ceramic material is particularly adapted to provide a hermetic seal with certain kinds of alloys. Furthermore, the invention relates to a method of producing the novel ceramic material.

Considerable effort has been devoted in the past to provide a ceramic material which will produce a hermetic seal with various metals such as specific nickel alloys and which will provide electrical insulation over an extended range of temperatures including temperatures well above 1000° Fahrenheit. Such efforts have not been entirely satisfactory and it has been found exceedingly difficult to extend the temperature range up to temperatures of 1800° F. The principal difficulty arises from the fact that the ceramic material expands through the extended temperature range in not quite the same manner as the metal to which it is to adhere, and at elevated temperatures the electric resistivity of the ceramic is reduced below useful levels for employment as an insulator, while the hermetic seal is being broken.

This invention provides a ceramic material which overcomes such disadvantages and maintains its hermetically characteristics and it maintains also an electrical resistivity above $10^6$ ohm/cm.$^2$ up to 1800° F.

The ceramic constituting this invention includes first and second fluxes whereby the first flux will be provided ahead of the second flux and will be used as one of the components that constitutes the second flux. The first flux includes a glass modifier such as calcium oxide, a glass former such as boron oxide, and a glass including the oxide of silicon. The second flux includes the first flux after smelting of the first flux, as one of its constituents. Preferably, one-fourth in weight of the second flux is constituted by the smelted and ground substance that resulted from the first flux. The second flux further includes additional calcium oxide, as glass modifier, and an additional glass modifier such as magnesium oxide is being added. The second flux includes also additional glass former such as aluminum oxide and an additional amount of boron oxide. The second flux furthermore includes as a glass oxide silicon dioxide as well as titanium dioxide. Each of the fluxes is individually formed by intimately mixing the various materals included in the flux and then melting the mixture.

Various materials capable of being used in forming ceramics may be generally divided as follows into three groups or categories:

TABLE I

Glass modifiers:
  Lithium oxide ($Li_2O$)
  Sodium oxide ($Na_2O$)
  Potassium oxide ($K_2O$)
  Lead oxide (PbO)
  Zinc oxide (ZnO)
  Strontium oxide (SrO)
  Calcium oxide (CaO)
  Magnesium oxide (MgO)

Glass formers:
  Arsenic oxide ($As_2O_3$)
  Boron oxide ($B_2O_3$)
  Bismuth oxide ($Bi_2O_3$)
  Aluminum oxide ($Al_2O_3$)
  Lanthanum oxide ($La_2O_3$)

Glass acid:
  Silicon dioxide ($SiO_2$)
  Ceramic dioxide ($CeO_2$)
  Zirconium dioxide ($ZrO_2$)
  Titanium dioxide ($TiO_2$)
  Molybdenum trioxide ($MoO_3$)

It will be appreciated that the listing of some of the materials in Table I may be considered as somewhat arbitrary since these materials may be considered by some people as belonging in a different one of the lists set forth in Table I. However, the listing of the materials set forth in Table I will be considered as proper by many of the experts in the art. It will be appreciated that other materials may also be included in each of the different categories. For example, the oxides of copper, silver and barium may be included in the first category designated as a glass modifier. These additional materials have not been included because of their low electrical resistivity, and because at least some of these materials will even act as an electrical conductor in colloidal solutions.

The glass modifiers may in general be considered as having alkaline properties and the properties of the base. The glass modifiers may further be considered as having a chemical formula which may be designated as $R_2O$ or RO, where R indicates the element forming the compound with oxygen O. The alkalinity of the element R in combination with oxygen in the glass modifying category or group tends to decrease progressively down the list, as does the reactivity of the compound with an acid. The electrical resistivity of the material at any particular temperature tends to increase progressively down the list. The melting temperature of the compounds in the glass modifiers tends to increase progressively down the list. No definite pattern as to the thermal coefficient of expansion of the oxide in the first category occurs with progressive listing in this category.

The third category or group may be considered as glasses and as having acidic properties. The chemical formula of these glasses may be expressed as $RO_2$ or $RO_3$, where R again is the element forming the glass compound with the oxygen. The melting temperatures of the different oxides included in the third category or group tend to increase progressively down the list although the melting temperatures of all the oxides of the third category are relatively high. The reactivity of the different oxides in the third category with acids tends to increase progressively down the list. No definite pattern as to the thermal coefficient of expansion of the oxides in the third category occurs with progressive listings in the category.

The second category or group of compounds is designated as glass formers in that the compounds in the second category tend to react with compounds in the third category to form the ceramic materials. The compounds in this second category or group may be designated by the chemical formula $R_2O_3$, where R indicates the element forming the compound with the oxygen. The glass formers are intermediate in chemical and physical properties to the glass modifiers and to the glasses. For example, the glass former may react chemically with either acidic or alkaline materials. The acid resistivity of the different oxides in the second category tends to increase progressively down the list, as does the melting temperature of the different oxides in this category. No definite pattern tends to exist as to the thermal coefficient of expansion of the different oxides listed progressively in this second category.

The ceramics constituting this invention are formed by combining materials from each of the three categories set forth above. The particular materials used and the properties of such materials are dependent upon the characteristics desired for the ceramic to be produced from the materials. For example, such characteristics as a melting temperature of the ceramic, the acid resistance of this ceramic, the thermal coefficient of expansion thereof as existing for different temperatures, and the electrical resistivity of the ceramic at different temperatures may be controlled by varying the particular materials used and by varying the proportions of such materials. Although the ceramic constituting this invention may be used as glasses, they can also be used as coatings or glazes and designated as "enamels".

As stated above, the ceramic constituting this invention is formed by two fluxes wherein the first flux serves as a component of the second flux. The first flux, called flux 1, is formed by mixing the following materials in the percentages indicated below:

TABLE II

| | Percent by weight |
|---|---|
| Calcium carbonate $CaCO_3$ | 45 |
| Boric acid $H_3BO_3$ | 35 |
| Silicon dioxide $SiO_2$ | 20 |

This flux 1 is produced by intimately mixing the partifices to homogenize the flux. After smelting, the mixture the mixture, for example, in a covered crucible, at a temperature of approximately 2000° F. This temperature suffices to homogenize the flux. After smelting, the mixture is quenched in water and is ground into fine particles having a size of the order of 400 mesh. The material is then dried.

After smelting, the flux is constituted by the following components:

TABLE III

| | Percent by weight |
|---|---|
| CaO | 38.5 |
| $B_2O_3$ | 31.0 |
| $SiO_2$ | 30.5 |

It has been found that the different materials in flux 1 may be varied in relative weight in the flux in accordance with the following table:

TABLE IV

| | Percent by weight |
|---|---|
| CaO | 30–45 |
| $B_2O_3$ | 25–35 |
| $SiO_2$ | 25–35 |

The completed flux 1 is then being used as a component in the preparation of a second flux. Again, the particles constituting the second flux are produced by intimately mixing the particles of the different materials and by smelting the mixture in a crucible, now at 2400° F. Flux 2 is produced by mixing the following materials in the percentages by weight as indicated below:

TABLE V

| | Percent |
|---|---|
| Flux 1 | 27.78 |
| Calcium carbonate $CaCO_3$ | 20.83 |
| Magnesium oxide MgO | 5.55 |
| Aluminum oxide $Al_2O_3$ | 5.55 |
| Boric acid $H_2BO_3$ | 1.40 |
| Silicon dioxide $SiO_2$ | 16.67 |
| Titanium dioxide $TiO_2$ | 22.22 |

It can be seen that $CaCO_3$, $H_3BO_3$ and $SiO_2$ are used not only in the preparation of the first flux, but additional quantities of these oxides are used and mixed into the second flux, aside from the fact that quantities of these materials as mentioned above are indirectly entered into the second flux by using the smelted first flux as one component thereof. The reason for the staggering of the adding of these oxides is that both calcium oxide and silicon dioxide tend to go rather slowly into the solution. It has been found that by using sequential fluxes containing in part similar materials, the homogenization is greatly enhanced. It should be mentioned that a small percentage of magnesium oxide added to flux 1 upon preparation thereof and considerably smaller than the percentage of the calcium oxide tends to increase the melting characteristics of the calcium oxide in this flux.

After smelting, the materials have the following percentages (by weight):

TABLE VI

| | Percent |
|---|---|
| CaO | 25.4 |
| MgO | 6.1 |
| $Al_2O_3$ | 6.1 |
| $B_2O_3$ | 10.1 |
| $SiO_2$ | 27.7 |
| $TiO_2$ | 24.6 |

Within the range given for varying the materials the final compound may vary, as far as its component is concerned, within the following ranges:

TABLE VII

| | Percent |
|---|---|
| CaO | 20–30 |
| MgO | 5.5–6.5 |
| $Al_2O_3$ | 5.5–6.5 |
| $B_2O_3$ | 8–12 |
| $SiO_2$ | 20–35 |
| $TiO_2$ | 20–30 |

Flux 1 may be included in flux 2 in a relative range of 20 to 35% and preferably to the extent of about one-fourth to obtain flux 2.

The ceramic in accordance with the present invention has the following characteristics: It has been found that the thermal coefficient of expansion is $5.23 \times 10^{-6}$. It has been found, further, that the ceramic forms a tight glass-to-metal seal in vacuum at temperatures up to 1500° F. and the electrical resistivity of the ceramic in ohms per square centimeter varies with temperature in accordance with the following table.

TABLE VIII

| Fahrenheit, degrees: | Ohm/cm.$^2$ |
|---|---|
| 200 | $7 \times 10^{14}$ |
| 400 | $4 \times 10^{14}$ |
| 600 | $9 \times 10^{13}$ |
| 800 | $6 \times 10^{12}$ |
| 1000 | $9 \times 10^{9}$ |
| 1200 | $1 \times 10^{9}$ |
| 1400 | $2 \times 10^{8}$ |
| 1600 | $3 \times 10^{7}$ |
| 1800 | $7 \times 10^{6}$ |

A ceramic made in accordance with the invention and having proportions as outlined above was then subjected to a cycle test hereinafter to be described. As a result of the test in which the ceramic was subjected to extreme temperature conditions, it was still hermetically leaktight and the electrical resistivity remained always above $10^6$ ohms/cm.$^2$.

For the test, the ceramic was first heated up to 1800° F. and was maintained at that temperature for one hour. The ceramic was then placed into air at room temperature (70° F.) and permitted to cool down to air temperature. After having remained at air temperature for one hour, it was heated up again to 1800° F. and maintained at such elevated temperature for one hour. Then the ceramic was placed into liquid nitrogen having a temperature of −325° F., for one hour. After one hour the ceramic was taken out of the liquid nitrogen and subjected to air at room temperature. After having been subjected to room temperature air for one hour, the ceramic was heated up again to 1800° F., and this elevated temperature condition was again maintained for one hour; then the hot ceramic was directly placed into liquid nitrogen at a temperature of −325° F., for one hour; then the ceramic was heated up to, and kept at, 1800° F., for one hour and then it was cooled to room temperature. After this test, the ceramic was still helium leaktight by $1 \times 10^{-10}$ cc. per second.

Each of the materials included in flux 2 contributes to the desirable properties of the material constituting this invention. For example, calcium oxide constitutes one of the basic materials in the ceramic and it combines with the oxides of silicon and boron to form the glass. The absence of barium oxide in this ceramic is significant since barium oxide tends to decrease the electrical resistivity. The oxide of silicon helps to satisfy the reaction in producing a complete chemical reaction of the different oxides in the mixture. Also, the silicon dioxide decreases somewhat the thermal coefficient of expansion. The oxide of boron facilitates smelting for both flux 1 and flux 2.

The aluminum oxide tends to slow the rate at which this ceramic material remelts, if the temperature should be raised to the temperature at which the ceramic material constituting this invention melts. By including the oxide of aluminum, the stiffness and viscosity of the material becomes enhanced. This characteristic is desirable in producing a hermetic or vacuum seal with a metallic member. The oxide of aluminum also tends to reduce the solubility in water of the ceramic material constituting the invention, and it tends to provide acid resistivity of the novel ceramic.

The aluminum and silicon may be preferably included in a ratio approaching the eutectic point appearing when aluminum and silicon have been mixed in the proportions of 1:13. This eutectic point causes the melting point of the mixture of aluminum and silicon to be reduced considerably below the melting point of either aluminum or silicon alone.

As may be seen from FIGURE 117 of "Phasing Diagram for Ceramics," published by the American Ceramics Society in 1956, the melting point of the mixture of aluminum and silicon in the ratio of approximately 1:13 reduces the smelting temperature used. A reduced melting temperature of the mixture of aluminum and silicon is desirable because a fusion between the two elements becomes considerably enhanced at the reduced temperature.

The oxide of aluminum as a glass former tends to make the ceramic material relatively stiff and provides it with an enhanced viscosity. This is an advantageous feature because it thereby extends the range of temperatures at which the ceramic material serves as a barrier against the flow of gas molecules of extraneous members through the ceramic material. The oxide of aluminum also tends to inhibit somewhat the rate at which the flux melts at its melting temperature. This is a desirable feature if the temperature of the flux should be raised inadvertently to the melting temperature after it has been formed.

The use of magnesium oxide increases the resistivity at high temperature. Additionally, the magnesium oxide added to at least one of the fluxes increases the melting characteristics of the calcium oxide. Other oxides such as the oxides of barium, strontium and zinc may also be substituted in whole or in part for the oxide of calcium. Titanium oxide has been included since in the extended temperature range it increases the tendency of the material to form a homogeneous mass. It is significant that no cerium oxide is used. Commonly, cerium oxide is regarded as the equivalent of titanium dioxide, but cerium oxide tends to reduce the temperature range of the ceramic material. Furthermore, titanium dioxide is advantageous in that it tends to enhance the properties of the material toward attaining a pure homogeneous mass. The oxide of zirconium may also be partially or wholly substituted for the oxide of titanium.

The ceramic made in accordance with the method outlined above has very good acid and alkaline resistance characteristics. It is stable in normal conditions. It is not stable in strong caustic or hydrofluoric acid. It is stable under all space by-products such as nitrogen tetroxide.

The ceramics constituting this invention may preferably be used in a glass-to-metal seal wherein the metallic parts include a nickel-chromium alloy known as Rene 41 and comprising approximately: 55% Ni, 19% Cr, 11% Co, 101% Mo, 3.1% Ti, 1.5% Al, and 0.1% C. The ceramic made in accordance with the preferred embodiment fuses with this alloy at 2100° F.

Other metals for a glass-to-metal seal using the novel ceramic and providing for a hermetic seal over an extended temperature range include nickel-chromium alloys known as Ra333 and Ra600.

Ra333 comprises approximately 45% Ni, 25% Cr, 18% Fe, 3% Mo, 3% W, 3% Co, 1.5% Mn, 1.25% Si, 0.05% C, 0.015% P, and 0.015% S.

Ra600 comprises approximately 75% Ni, 15% Cr, 8% Fe, 0.7% Mn, 0.3% Si, 0.05% C, 0.015% P, and 0.01% S.

The invention is not limited to the embodiments described above, but all changes and modifications thereof not constituting departures from the spirit and scope of the invention.

What is claimed is:
1. A method of producing a ceramic comprising the steps of:
   producing a first flux by mixing and smelting, at approximately 2000° F. oxides of calcium, boron and silicon to result in approximately 30%–45% CaO, 25%–35% $B_2O_3$, and 25%–35% $SiO_2$;
   producing a second flux which consists of approximately one-fourth of its total weight of said first flux, and which second flux also consists of additional amounts of the oxides of calcium, boron and silicon and which second flux further consists of magnesium oxide, aluminum oxide and titanium dioxide to result in about 20%–30% the oxide of calcium, 5.5%–6.5% the oxide of magnesium, 5.5%–6.5% the oxide of aluminum, 8%–12% the oxide of boron, 20%–35% the oxide of silicon, and 20% to 30% the oxide of titanium, all percentages by weight, and
   smelting said second flux at about 2400° F.

2. A method of producing a ceramic, comprising the steps of:
   producing a first flux consisting of approximately 38.5% CaO, 31% $B_2O_3$, and 30.5% $SiO_2$, all percentages by weight;
   smelting said first flux at a temperature of approximately 2000° F.;
   grinding said first flux;
   producing a second flux consisting of said ground first flux and additional amounts of CaO, $B_2O_3$ and $SiO_2$ to provide in said second flux approximately 25.4% CaO, 10.1% $B_2O_3$ and 27.7% $SiO_2$ and further consisting of approximately 6.1% MgO, 6.1% $Al_2O_3$ and 24.6% $TiO_2$, all percentages by weight, and smelting said second flux at a temperature of about 2400° F.

References Cited

UNITED STATES PATENTS

| | | | |
|---|---|---|---|
| 2,837,487 | 1/1958 | Huttar | 106—48 |
| 3,001,881 | 9/1961 | Slayter | 106—52 |
| 3,024,121 | 3/1962 | Hagedorn | 106—52 |
| 3,274,006 | 9/1966 | McKinnis | 106—54 |
| 3,279,932 | 10/1966 | Earl | 106—48 |
| 3,287,095 | 11/1966 | Procter et al. | 106—54 |

FOREIGN PATENTS

| | | |
|---|---|---|
| 2,371 | 1855 | Great Britain. |
| 2,284 | 1870 | Great Britain. |
| 239,349 | 9/1925 | Great Britain. |
| 393,907 | 6/1933 | Great Britain. |

HELEN M. McCARTHY, Primary Examiner

U.S. Cl. X.R.

106—54

UNITED STATES PATENT OFFICE
CERTIFICATE OF CORRECTION

Patent No. 3,493,404                          February 3, 1970

John Alfred Earl

It is certified that error appears in the above identified patent and that said Letters Patent are hereby corrected as shown below:

Column 2, line 1, "materals" should read -- materials --; line 26, "Ceramic" should read -- Cerium --. Column 3, line 44 "fices to homogenize the flux. After smelting, the mixture" should read -- cles of the different materials in the flux and by smelting --. Column 4, TABLE V, first column, line 5 thereo "Boric Acid $H_2BO_3$" should read -- Boric Acid $H_3BO_3$ --.

Signed and sealed this 17th day of November 1970.

(SEAL)
Attest:

Edward M. Fletcher, Jr.                      WILLIAM E. SCHUYLER, JR
Attesting Officer                                Commissioner of Patents